May 11, 1937.  C. E. KEEFER  2,080,137
SEDIMENTATION APPARATUS
Filed Dec. 27, 1935  4 Sheets-Sheet 1

Inventor
C. E. Keefer,
By Arthur Middleton
Attorney

May 11, 1937. C. E. KEEFER 2,080,137
SEDIMENTATION APPARATUS
Filed Dec. 27, 1935   4 Sheets-Sheet 2
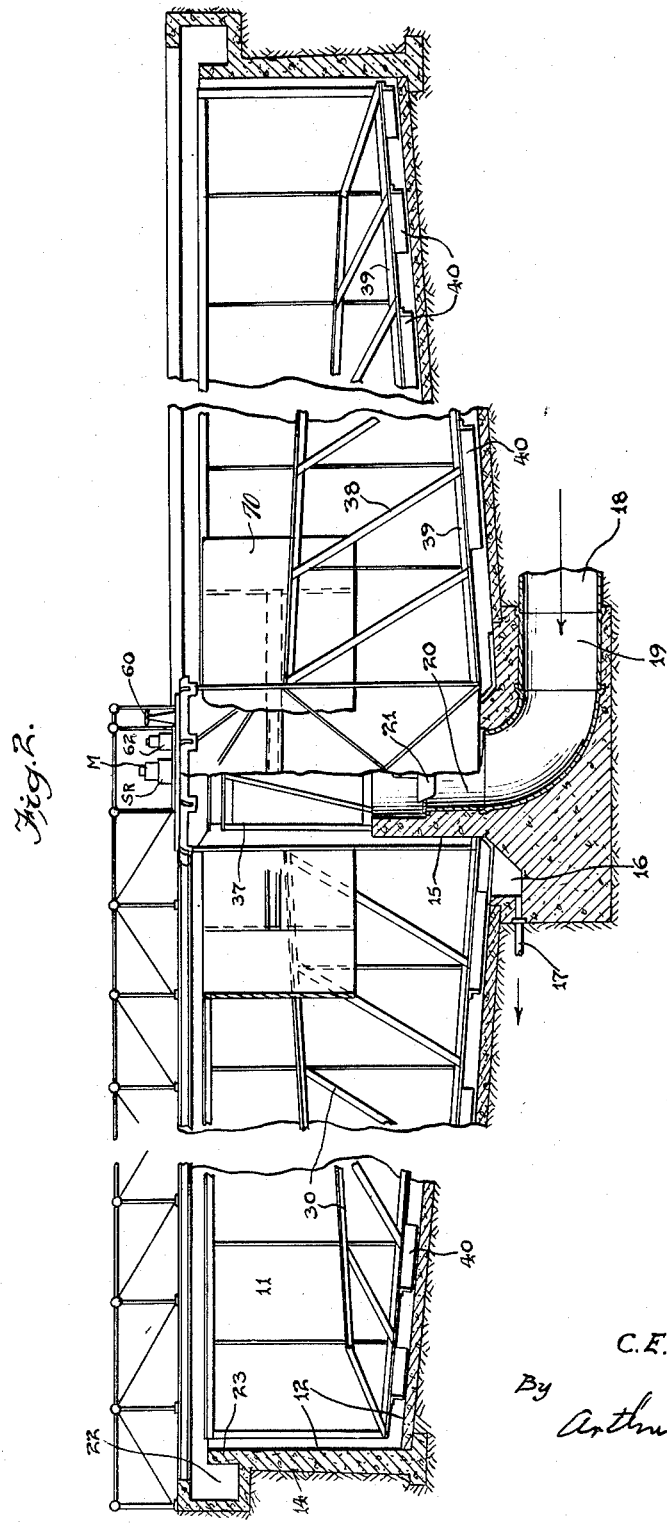
Inventor
C. E. Keefer,
By Arthur Middleton
Attorney

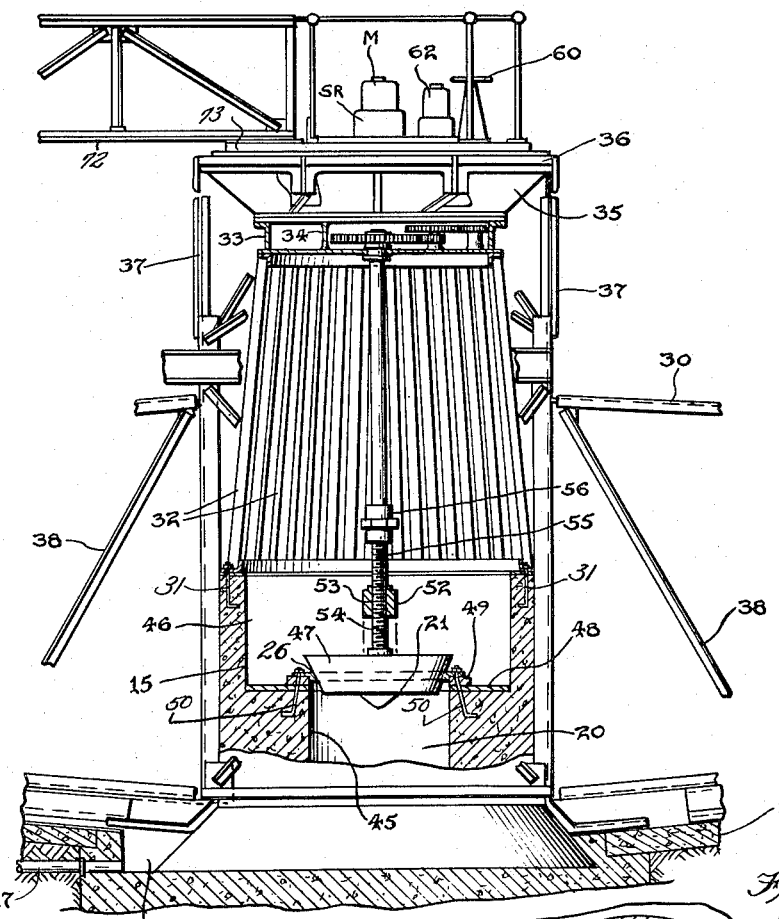
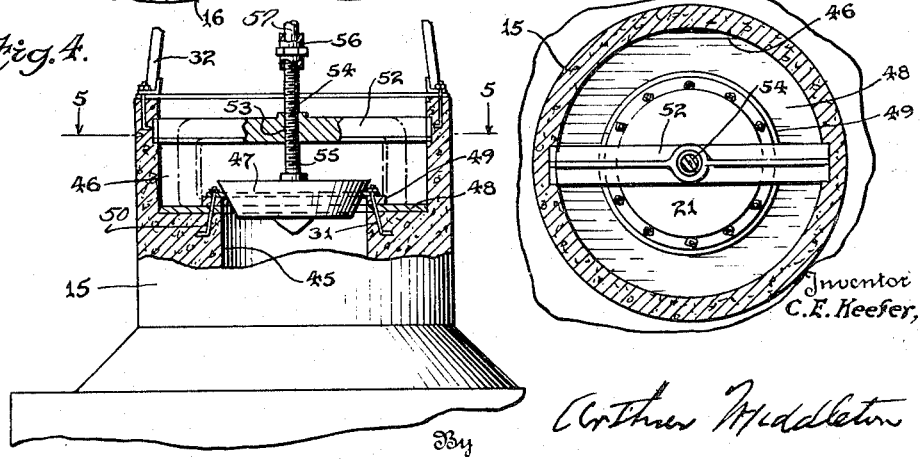

May 11, 1937. C. E. KEEFER 2,080,137
SEDIMENTATION APPARATUS
Filed Dec. 27, 1935 4 Sheets-Sheet 4
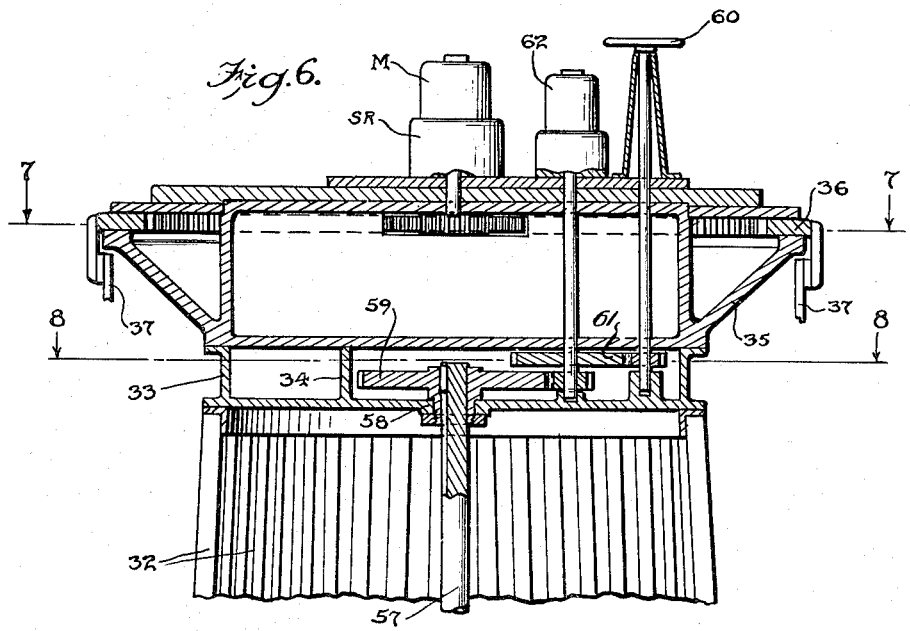
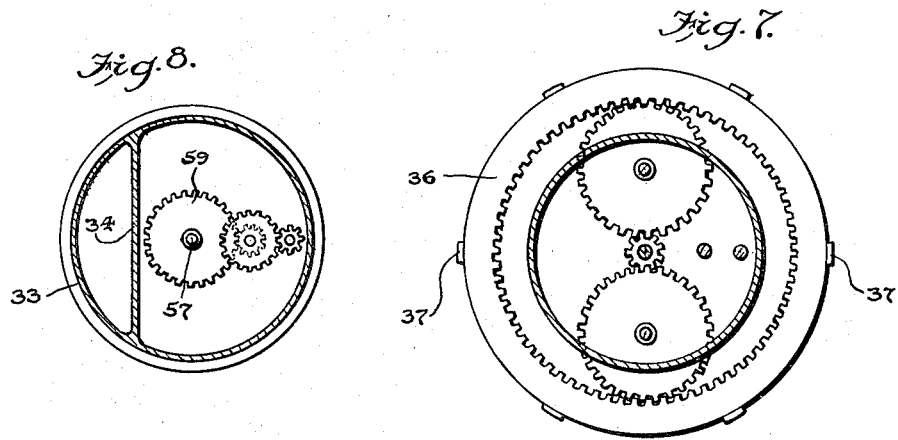
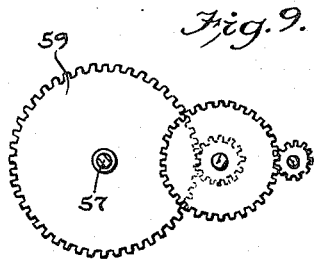
C. E. Keefer, Inventor
By Arthur Middleton
Attorney Patented May 11, 1937

2,080,137

UNITED STATES PATENT OFFICE 2,080,137

SEDIMENTATION APPARATUS

Clarence E. Keefer, Baltimore, Md.

Application December 27, 1935, Serial No. 56,391

8 Claims. (Cl. 210—55)

This invention relates to the clarification of liquids by sedimentation in settlers or clarifiers. More particularly, the invention relates to the control of the feeding to the settler of the liquid to be treated therein.

Liquids having solid impurities in suspension therein such as water, sewage, trade-wastes, and the like polluted waters are usually passed through sedimentation tanks or basins such as clarifiers or settlers wherein the liquid is held quiescent enough for the solids in suspension therein to be acted upon by gravity to settle to the bottom of the tank in the form of sediment or sludge, and travelling rakes in the tank transfer the sedimented sludge to discharge. The liquid to be treated is usually continuously fed to the settler or clarifier through an influent launder channel or pipe, and the supernatant liquid in the clarifier continuously flows therefrom over a weir as clarified effluent.

The liquid can be satisfactorily fed to the clarifier through a conduit entering the clarifier in the bottom section thereof. At present it is customary for this conduit to terminate in or merge into a hollow pier or column upstanding within the clarifier, which may contribute to the support of the travelling sludge raking mechanism. In such a case, the liquid passes upwardly through the hollow pier or column and then is diffused outwardly more or less radially to be exposed to sedimentation. It is desirable to control the emittance of the liquid from the conduit or hollow pier into the tank or into the body of liquid already in the tank, so the principal object of this invention is the devising of valve apparatus suitable for use in giving the operator thereof such control.

When a stream of liquid to be clarified by sedimentation is fed to a clarifier upwardly through its bottom section and outwardly from a hollow pier or pedestal, and especially if that liquid is carrying its solid impurities in flocculated form, care has to be exercised so that the fragile flocs of the liquid will not be disintegrated or otherwise harmed by any sudden change in velocity of the liquid stream, or by the abrupt encountering of any obstruction. Therefore, another object of this invention is to arrange the valve apparatus in the hollow pier in a manner to avoid these pitfalls.

As such clarifiers or settlers have considerable depth, the valve itself for controlling the emittance of the feed into the tank will be located well below the liquid level in the clarifier, if not actually submerged in the liquid therein, so another object of this invention is to devise apparatus extending from the valve itself upwardly to emergence to give accessibility to an operator of the valve for opening or closing it. Another object is to arrange for connections whereby the valve may be mechanically operated. And a still further object of the invention is to devise an arrangement having the above mentioned functions fitting with good cooperating relationship in present accepted types of settlers or clarifiers, especially those of the hollow centerpier wherein the feed comes up through the hollow pier—all without interfering with the rotating sludge raking mechanism which operates in connection with the pier.

The manner in which the invention may be carried out is to locate in a hollow centerpier of a clarifier through which the clarifier feed flows upwardly and then outwardly, a valve for controlling the passage through and exit from the hollow pier of the clarifier feed, with the design of the cooperating elements being such that (1) in passing by the valve flocculent clarifier feed does not have flocs thereof damaged; (2) the velocity of the liquid feed passing through the valve is not essentially diminished either then or immediately therebefore and thereafter; and (3) operation of the valve can be controlled from a place of accessibility thereto somewhere in the vicinity of the clarifier top.

While this invention may be used on a settler for either purpose, the invention is apt to find its greatest usefulness in clarifiers and particularly those for the treatment of flocculent liquids, such as in secondary clarifiers in sewage treatment plants and clarifiers for water purification plants.

With these and possibly other objects in view the invention is shown and described herein in one embodiment thereof chosen for illustrative purposes so that it should not be taken as limiting, for obviously the invention is capable of other embodiments which still come within the scope of the appended claims as permitted by the prior art. The chosen embodiment of the invention is illustrated in the accompanying drawings.

In said drawings Fig. 1 is a plan view partially broken away showing the sedimentation unit or apparatus and is illustrative of the settling tank, and of the rotatable sludge or sediment raking or conveying assemblage or mechanism with which the tank is provided.

Fig. 2 is a vertical view partially broken away showing the tank in section and the raking and conveying mechanism therein.

Fig. 3 is a partial view in which there is illustrated the manner by which the raking and conveying assemblage is mounted and rotatably supported at the top of a structure carried by and supported from the hollow pedestal or pier; this view particularly illustrates the vertically positionable stop valve which is relied upon for controlling or shutting off the inflow to the tank and it also illustrates how a turntable arrangement is employed whereby the raking and conveying assemblage is turnably mounted and operated.

Fig. 4 is a detail view of the vertically positionable stop valve construction and is a view taken as on the plane indicated by the line 4—4 of Fig. 3 looking in the direction of the arrows.

Fig. 5 is a detail view of the valve arrangement and is a view taken as on a horizontal plane indicated by line 5—5 of Fig. 4 looking in the direction of the arrows.

Fig. 6 is a view at a larger scale than that of Fig. 3—showing the turntable construction and the valve operating gearing mechanism. In this Figure 6 some of the parts are shown in section, while other portions thereof are broken away to aid in clarity of illustration.

Figure 1:
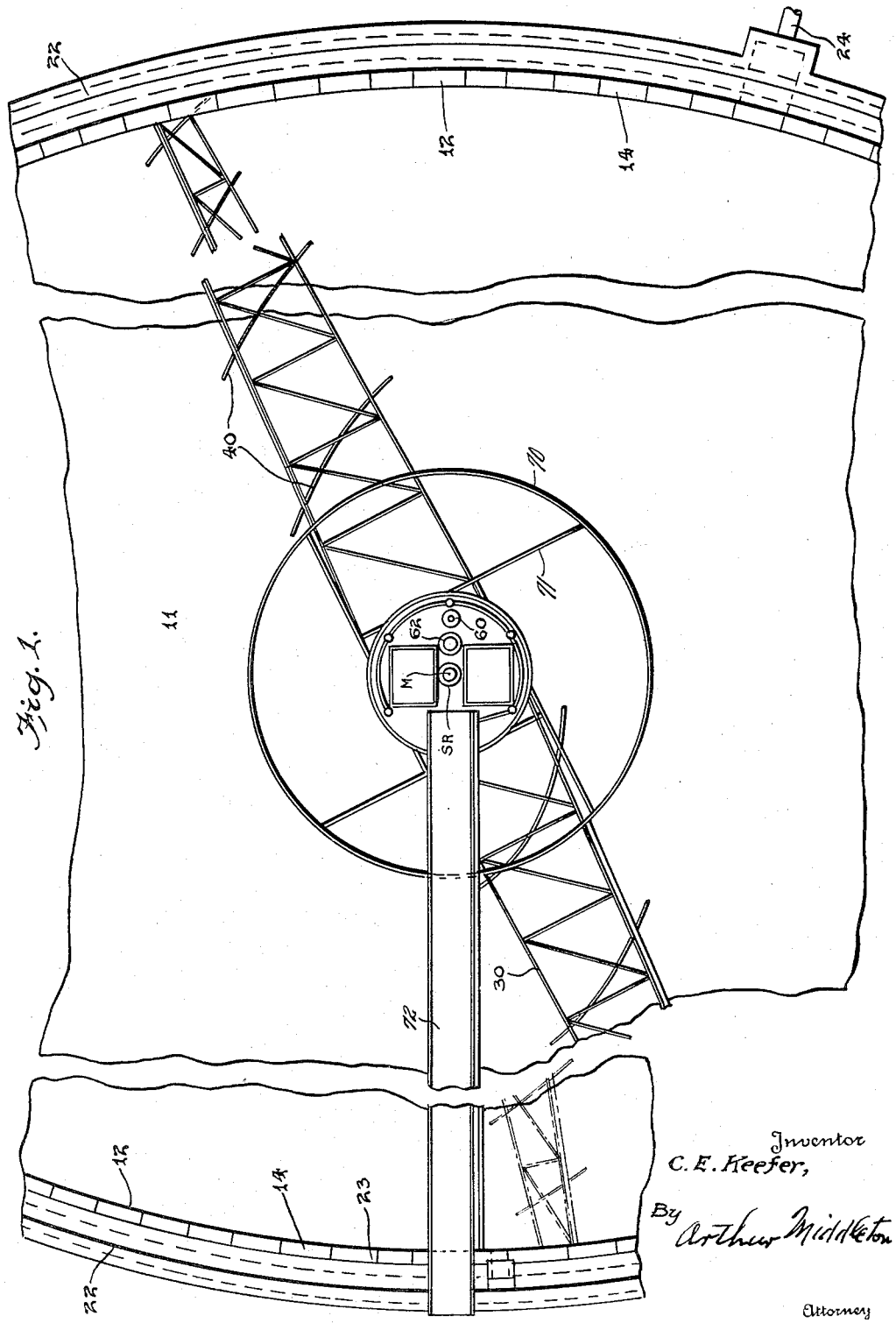

Fig. 7 is a horizontal sectional view taken as on the plane indicated by line 7—7 of Fig. 6 looking in the direction of the arrows. This is a view illustrating the manner in which the driven annular gear that is a part of and which is turnable with the movable supported portion of the turntable construction, is driven from an operating motor therefor through the medium of speed reducing and power transmission gearing.

Fig. 8 is a horizontal sectional view taken as on the plane indicated by the line 8—8 of Fig. 6 looking in the direction of the arrows.

Fig. 9 shows the arrangement of gearing in Fig. 8 at a somewhat larger scale. The gearing shown in Figs. 8 and 9 are illustrative of the gearing construction which is provided whereby either a handwheel or a motor can be employed for turning of the spindle vertically positionable stop valve.

Reference will now be made to the drawings in detail. The sedimentation apparatus or sedimentation tank as a whole is designated 11 and it comprises the settling tank or basin structure 12 having a bottom or floor providing portion 13 and upstanding marginal wall or boundary portion 14. The tank also has a hollow upstanding central pier or pedestal portion 15. The bottom has a slight downward and inward inclination, to wit, a downward inclination as it approaches the pier or pedestal 15 just referred to.

A sump or depressed settled solids discharge section 16 is provided at or near the juncture of the sloping bottom 13 and the hollow pedestal 15. A pipe or conduit 17 leads from this sump and in conjunction with the sump or depressed discharge section 16 just referred to constitutes what may be referred to as the settled solids or sludge discharge. In short these parts 16 and 17 constitute what may be viewed as important features of a means by which the settled solids or sludge in the sump or transferred thereto can be hydraulically passed from the sedimentation tank.

The influent or feed for the incoming liquid solids mixture is through feed or supply pipe 18 having a lower section 19 leading to an upflow delivery section 20, whereby the liquid solids mixture is fed and initially delivered to and into the central portion of the settling tank. The feed or supply pipe just referred to is preferably a part of what is frequently referred to in the trade as an inverted siphon or U-shaped feed in which the delivery end of the siphon or U-shaped feed is provided by an upwardly extending leg or delivery section thereof which is centrally located within and with respect to the tank structure. In the construction shown the flow through the upwardly extending leg or upflow section 20 is controlled or regulated through the medium of a mechanically actuated vertically positionable plug valve or valve member 21, the operating mechanism of which will be described later.

The sedimentation tank is provided with an effluent launder construction at 22. In the form shown this effluent launder is of a marginal or peripheral type of launder, but it will be manifest that other types of launder can be employed. The supernatant liquid from the upper interior portion of the settling tank enters the outflow or effluent launder 22 by flowing over an outflow weir 23. This weir determines the normal operating level N. L. within the tank. The liquid that overflows the weir 23 into the launder 22 passes therefrom through the outflow discharge 24.

As the liquid which is supplied into the central portion of the settling tank passes towards the effluent launder there is allowed a sufficient detention period whereby the desired settling of solids is realized. These solids settle towards or upon the bottom 13 of the tank and a turnable settled solids or sediment raking and conveying assemblage or mechanism is provided for raking and impelling settled solids or sludge from the diverse sections of the bottom of the tank towards and into the sludge discharge sump or settled solids discharge section 16 heretofore referred to. This turnable sludge or settled solids raking and conveying mechanism referred to is collectively designated as 30 and in the construction shown, it is entirely mounted upon and carried from the central pier or pedestal section 15, so as to turn about the same as an axis. The mode of and mechanism for mounting and rotating this settled solids raking assembly from a hollow central pier employs and embodies the teachings of the Scott U. S. Patent No. 1,888,743 (or the corresponding British Patent No. 399,297) and reference is therefore made to the patent just mentioned as illustrative of the manner by and according to which the settled solids raking and conveying mechanism is mounted and operated so as to be carried from and so as to turn about the central hollow pier or pedestal 15. In view of the disclosure of the patent just mentioned, a detailed description of the sludge raking and conveying mechanism and of the mode of and mechanism for supporting and operating the same is believed to be unnecessary herein.

It will be pointed out, however, in a general manner, that the hollow central pier 15 constitutes or provides a base portion to which there is secured, by means of foundation bolts 31, upwardly extending struts or supporting members 32, carrying at the upper end thereof frame or platform members as 33 and 34, whereby a stationary platform is provided upon which there is located a stationary turntable base member as 35 having an annular supporting surface at the upper portion thereof. Upon this stationary turntable base member 35 there is supported so as to turn or rotate about a vertically extending axis the movable member 36 of a turntable construction. The upper section of a cage or arm supporting structure 37 is secured to and carried by the turnable member 36 just referred to. In other words, this cage or arm carrying structure is supported from and by the movable turntable member, so as to depend therefrom and so as to turn as and when the movable turntable member turns. This depending cage has secured thereto radially extending rake carrying arms 38 providing lower section 39 to which there are secured and from which there depend sludge rakes or blades 40 that are sloped rearwardly and inwardly in respect to the direction of the travel therefor, whereby they function to effect the raking and transferring of settled solids to the depressed section or sump 16, due to the plowing or impelling action as the blades move. These blades extend to and into the region immediately above the tank bottom, so that in effect they scrape the floor or bottom of the settling tank.

The invention hereof primarily revolves about the introduction of the plug valve 21 heretofore referred to in the upflow section of the feed conduit. The arrangement is such that by lowering the valve member 21 towards or upon its seat the upflow through the section 20 can be slowed down or entirely cut off as the case may be.

In the pier or pedestal section 15 the conduit passageway section 45 which is immediately below the valve 21, or as otherwise expressed, that portion of the upflow delivery section 20 which is below the annular seat 26 for the plug valve 21, has an area which is substantially that of the lower portion of the feed or supply pipe 18. In some forms of construction the area at 45 might be made smaller or larger according to the particular requirements.

In the region 46, to wit, in the region immediately around and above the plug valve 21, the upflow conduit has been enlarged as to its horizontal cross sectional area and so that there will be left about the valve particularly when the valve is opened, a flow area at least substantially equal to that of the horizontal cross sectional area of the section 45 immediately below the valve or in any event equal to that through the valve seat 26. This construction is provided in order that there may be a relatively free and ready upflow of the incoming liquid through the valve construction and past the plug valve 21 thereof and whereby any substantial restriction is avoided particularly when the valve is in its full open position.

The plug valve 21 referred to is a part of a valve means collectively designated as 47. This valve means 47 comprises the seat 26 which is preferably annular, but which may be of other shapes, and a base casting 49 to which the annular seat is preferably detachably secured in any suitable manner. This base casting is secured as through the medium of foundation bolts 50 to the main body portion of the pier or pedestal 15. Suitable packing or grouting material is preferably provided as at 48 between the base casting 49 and the concrete or other structural material of and defining the body of the centerpier. The parts just referred to are assembled in such a manner as to provide a liquid-tight joint as between the annular seat 48 on the one hand and the body or centerpier or pedestal on the other hand.

The valve means 47 also comprises a yoke 52 which is fixedly secured in respect to the seat 48, as for example, by being fixedly secured to the structure constituting the body portion of the pier or pedestal 15 or as by being directly connected to or made so as to constitute an integral part of the base casting 49. This yoke has a portion providing a screw threaded opening at 53 and receives the screw threaded portion 54 of the valve stem 55. The movable plug valve member 21 is connected to the lower end of the valve stem, preferably through the medium of a swivel type of connection such as is often used in valve construction especially where the movable valve member proper is large.

In the construction shown the valve stem has secured thereto as through the medium of a coupling 56 an upwardly extending valve stem extension section 57, the upper end of which passes through a guide bearing at 58 and enters to and into a driving gear 59 therefor. According to the construction shown the extension 57 has a vertically sliding feathered or splined connection with the gear 59 whereby the valve stem can be driven as the gear 59 turns. The construction just referred to is such that as the valve stem raises and lowers the extension 57 can have vertical raising or lowering movement as the case may be with respect to the gear 59, the latter of which is held in any suitable manner against vertical movement. As a matter of fact, it is feasible to have this gear 59 provided with a hub portion which enters into a fixed bearing provided as at 58 and for the entire guiding effect of the extension 57 to be realized solely because of the guiding which it obtains as the result of its extending through the gear 59 and because of the sliding engagement which it has within and with the hub portion of the gear 59.

The driving of this gear 59 for operating the valve 21 may be accomplished through the medium of a hand operated mechanism comprising the handwheel 60, and transmission gear, collectively designated as 61 or from a motor 62 the rotor of which has driving connection with the gear 59 through the medium of speed reducing and power transmission embodying or providing the operating gearing 61 heretofore referred to.

The plug valve 21 is preferably provided with gradually changing curved surfaces so as to permit substantial streamline flow effects to be realized.

Where the incoming feed is a flocculated feed, to wit, where the incoming liquids have been subjected to primary treatment to aid and further floc formation or coagmenting action, it is desirable and important that the feeding means leading to the settling tank be of a character which will not tend to cause the breaking up or the disrupting of the flocs which have been formed. In other words, it is desirable to have an inflow of a character which will permit a free, easy and gentle flow from the flocculation zone to and into the settling tank whereby there is realized a drifting of the floc into the sedimentation basin as along and through a relatively free and unobstructed flow path.

A vertically movable plug valve member which always stays in the inflow path necessarily causes a change in flow direction incident to liquids flowing past the plug valve and in order to lessen and avoid detrimental effects from this change in direction, it is advisable that the changes in flow direction be made gradual and easy. To that end the lower end of the valve member 21 leading downwardly from the peripheral seating section thereof is caused to slope gradually inwardly and downwardly, thereby providing a downward cone-like projection which can be relied upon to gradually direct and deflect upflow liquid towards the marginal or seating portion of the valve.

It is also feasible and in certain respects desirable to provide a gradual decreasing upper section leading from the marginal defines of the valve 21 whereby streamline effects are further realized at and for what may be termed the upper or rear sections of the valve.

The turnable member 36 embodies as a part thereof an internal annular gear. This internal annular gear when driven effects a turning of the movable turntable member 36 and is driven from the motor "M" through a suitable speed reducing and power transmission mechanism the casing of which is marked "SR" and the gears of which form a train extending from the rotor of the motor to the driven internal annular gear just referred to.

A cylindrical shell as 70 is provided so as to provide a centrally disposed influent well or diffuser plate. This influent well or diffuser plate functions to assure a gentle influent delivery into the sedimentation tank and in a more or less downward direction. It also prevents any short circuiting or direct flow of the influent to a particular outflow section of the tank. This shell 70 is directly secured to the sludge raking arms 38 and in fact, may be considered as a part of the turnable assemblage 30. In short this influent well 70 moves with and as a part of the turnable assemblage. Bracing struts may be provided by such as indicated by 71. These struts preferably extend from an upper portion of the cage 37 directly to the cylindrical shell.

The operating mechanisms, to wit, the motors, the gearing and the movable member 36 of the turntable construction are all above the level of the liquid within the basin above the general level indicated by the line N. L.

It is entirely feasible to have the yoke 52 provided with a smooth bored opening at 53 whereby the yoke becomes merely a steady bearing for the valve stem 57 and in such modification the screw threaded portion of the valve stem would be at or in the region of the guide bearing 58, to wit, above the normal liquid level N. L.

It is, of course, advisable to have ready access to the motors and operating mechanisms just referred to and to that end a walkway truss construction 72 is provided that extends from the marginal portion of the tank on the one hand, to the centerpier construction on the other. The inner end of this walkway truss derives support in a suitable manner from a stationary section of the structure which is carried by and from the centrally located hollow pier or pedestal 15. This support is through the medium of a stationary structural element such as is provided by a member 73 (see Fig. 6), that constitutes a part of the stationary turntable base member 35 and about which the internal gear and the movable member 36 of the turntable construction turns.

I claim:

1. In a sedimentation tank having a bottom, sides, an effluent overflow discharge, a sediment discharge, and a hollow pedestal upstanding from the tank bottom and through which liquid to be treated in the tank is fed to the tank; the combination therewith of valve means horizontally disposed within the upstanding pedestal for controlling the flow from said pedestal of feed liquid to the tank.

2. The combination with a sedimentation tank having a bottom, sides, an effluent overflow discharge, a sediment discharge, and a hollow pedestal upstanding from the tank bottom forming a conduit through which liquid to be treated in the tank is fed to the tank; of a valve seat within said pedestal and surrounding the conduit and a valve coacting with said valve seat for controlling the passage of feed liquid through the conduit of said pedestal.

3. The combination with a sedimentation tank having a bottom, sides, an effluent overflow discharge, a sediment discharge, and a hollow pedestal upstanding from the tank bottom form a conduit through which liquid to be treated in the tank is fed to the tank; of a valve seat within said pedestal and surrounding the conduit, and a valve coacting with said valve seat for controlling the passage of feed liquid through the conduit of said pedestal, the bore of the conduit in said pedestal being greater above the valve-seat than below it.

4. The combination with a sedimentation tank having a bottom, sides, an effluent overflow discharge, a sediment discharge, and a hollow pedestal upstanding from the tank bottom form a vertically extending upflow conduit through which the liquid to be treated in the tank is fed to the tanks; of a horizontally extending annular valve seat within said pedestal and surrounding the conduit and a vertically positionable plug valve coacting with said valve seat for controlling the passage of feed liquid through the conduit of said pedestal.

5. The combination with a sedimentation tank having a bottom, sides, an effluent overflow discharge, a sediment discharge, and a hollow pedestal upstanding from the tank bottom forming a conduit through which liquid to be treated in the tank is fed to the tank below the liquid level thereof; of a valve seat horizontally disposed within the pedestal below the liquid level of the tank and adapted to be submerged in the liquid in the tank, a valve coacting with said valve seat for controlling passage of feed liquid through the conduit of said pedestal, and means extending from said valve in submergence to adjacent the top section of the tank by which the valve may be operated.

6. The combination with a sedimentation tank having a bottom, sides, an effluent overflow discharge, a sediment discharge, and a hollow pedestal upstanding from the tank bottom forming a conduit through which liquid to be treated in the tank is fed to the tank below the liquid level thereof, an annular structure mounted from said pedestal, and a motor driven rotatable sediment raking mechanism deriving support from said annular structure; of a valve seat within said pedestal below the liquid level of the tank and adapted to be submerged in the liquid of the tank, a valve coacting with said valve seat for controlling passage of feed liquid through the conduit of said pedestal, and means extending from said valve in submergence through said annular structure to the environment of the motor of said motor-driven sludge raking mechanism by which the valve may be controlled.

7. A sedimentation tank having a bottom, sides, an effluent overflow discharge, a sediment discharge, a rotatable sediment raking mechanism for transferring settled sediment to discharge, a hollow pedestal upstanding from the tank bottom forming a conduit through which liquid to be treated in the tank is fed to the tank below the liquid level thereof, an annular structure mounted from said pedestal, a motor for operating said raking mechanism deriving its support along with the raking mechanism from said structure mounted from said pedestal, a valve seat within said pedestal surrounding the conduit of the pedestal, a valve coacting with said valve-seat, and power transmission means for operating said valve deriving its support from said annular structure.

8. In combination in a settler, a hollow pedestal therein forming a conduit upwardly through which liquid to be treated in the settler is adapted to be fed, and valve means located within said pedestal for controlling passage of liquid fed through the conduit therein, said valve means being interposed between upper and lower sections of said pedestal and operable to cut off liquid communication between said sections.

CLARENCE E. KEEFER.